United States Patent
Chui et al.

(10) Patent No.: US 11,996,883 B2
(45) Date of Patent: May 28, 2024

(54) METHOD AND DEVICE FOR RECOVERING SUB-SIGNALS FROM COMPOSITE SIGNAL OF BLIND SOURCE

(71) Applicant: Ka Luen Fung, Hong Kong (HK)

(72) Inventors: Charles K. Chui, Menlo Park, CA (US); Ka Luen Fung, Hong Kong (HK); Herman C. Chui, Los Altos, CA (US)

(73) Assignee: Ka Luen Fung, Hong Kong (HK)

( * ) Notice: Subject to any disclaimer, the term of this patent is extended or adjusted under 35 U.S.C. 154(b) by 65 days.

(21) Appl. No.: 17/884,542

(22) Filed: Aug. 9, 2022

(65) Prior Publication Data

US 2024/0056182 A1    Feb. 15, 2024

(51) Int. Cl.
  *H04B 17/00* (2015.01)
  *H04B 10/077* (2013.01)
  *H04B 10/548* (2013.01)

(52) U.S. Cl.
  CPC ....... *H04B 10/0775* (2013.01); *H04B 10/548* (2013.01); *H04B 17/00* (2013.01)

(58) Field of Classification Search
  CPC .. H04B 10/0775; H04B 10/548; H04B 17/00; G10L 21/0272; G10L 21/028; G10L 21/0308; G06F 17/10; G06F 17/40; G06F 18/2131; G06F 18/213; G06F 18/21; G06F 18/20
  See application file for complete search history.

(56) References Cited

U.S. PATENT DOCUMENTS

| | | | |
|---|---|---|---|
| 5,983,162 A | 11/1999 | Huang | |
| 6,631,325 B1 | 10/2003 | Huang et al. | |
| 6,738,734 B1 | 5/2004 | Huang | |
| 6,862,558 B2 | 3/2005 | Huang | |

(Continued)

FOREIGN PATENT DOCUMENTS

| | | |
|---|---|---|
| CN | 110765560 A | 2/2020 |
| CN | 111368466 A | 7/2020 |

OTHER PUBLICATIONS

Chui et al. "Wavelet thresholding for recovery of active sub-signals of a composite signal from its discrete samples." Nov. 26, 2020. Applied and Computational Harmonic Analysis. vol. 52, May 2021, pp. 1-24. https://www.sciencedirect.com/science/article/pii/S1063520320300798#fg0010 accessed Dec. 6, 2023 (Year: 2021).*

(Continued)

*Primary Examiner* — David S Huang
(74) *Attorney, Agent, or Firm* — Idea Intellectual Limited; Margaret A. Burke; Sam T. Yip

(57) ABSTRACT

A computer-implemented method for recovering one or more active sub-signals from a composite signal of a blind source is provided. The method includes: performing an offline preparing process to generate a lookup table of Continuous Wavelet Transform (CWT)-basic elements (WBEs); when receiving raw data of the composite signal of the blind source, performing a real-time process to recover the one or more active sub-signals of the composite signal according to the lookup table of WBEs by formulating the composite signal by a Realistic Adaptive Harmonic Model (RAHM); and generating analysis data comprising one or more attributes of the active sub-signals.

15 Claims, 11 Drawing Sheets

(56) References Cited

U.S. PATENT DOCUMENTS

| | | |
|---|---|---|
| 6,901,353 B1 | 5/2005 | Huang |
| 6,990,436 B1 | 1/2006 | Huang |
| 7,054,792 B2 | 5/2006 | Frei et al. |
| 7,464,006 B1 | 12/2008 | Huang |
| 7,941,298 B2 | 5/2011 | Huang et al. |
| 8,732,113 B2 | 5/2014 | Huang et al. |
| 8,798,399 B2 | 8/2014 | Huang et al. |
| 9,087,141 B2 | 7/2015 | Huang et al. |
| 9,467,182 B2 | 10/2016 | Chang et al. |
| 9,565,040 B2 | 2/2017 | Kirsch et al. |
| 2015/0162009 A1 | 6/2015 | Huang et al. |
| 2015/0193376 A1 | 7/2015 | Yeh et al. |
| 2015/0323507 A1 | 11/2015 | Huang |
| 2016/0292894 A1 | 10/2016 | Huang et al. |
| 2017/0079538 A1 | 3/2017 | Liang et al. |
| 2017/0116155 A1 | 4/2017 | Huang et al. |
| 2017/0119270 A1 | 5/2017 | Juan et al. |
| 2019/0175041 A1 | 6/2019 | Huang |
| 2023/0130863 A1* | 4/2023 | Kuzdeba .......... G06N 3/09 706/41 |

OTHER PUBLICATIONS

Chui et al. "Signal decomposition and analysis via extraction of frequencies" Jan. 13, 2015. Applied and Computational Harmonic Analysis. vol. 40, Jan. 2016. https://www.sciencedirect.com/science/article/pii/S1063520315000044?via%3Dihub accessed on Dec. 6, 2023 (Year: 2015).*

Charles K. Chui, "Multivariate Splines", CBMS-NSF Regional Conference Series in Applied Mathematics, Society for Industrial and Applied Mathematics, 1988, Series 54.

Charles K. Chui, "An Introduction to Wavelets", Wavelet Analysis and Its Applications, Academic Press, 1992, vol. 1.

Charles K. Chui, "Wavelets: A Mathematical Tool for Signal Analysis", SIAM Monographs on Mathematical and Computation, Society for Industrial and Applied Mathematics, 1997.

G. Chen et al., "Construction of Real-Time Spline Quasi-Interpolation Schemes", Approximation Theory and Its Applications, Nanjing University Press, Dec. 1988, vol. 4, No. 4, pp. 61-75.

Charles K. Chui et al., "A Natural Formulation of Quasi-Interpolation by Multivariate Splines", Proceedings of the American Mathematical Society, American Mathematical Society, Apr. 1987, vol. 99, No. 4, pp. 643-646.

Charles K. Chui et al., "A General Framework for Local Interpolation", Numerische Mathematik, Springer-Verlag, 1991, vol. 58, pp. 569-581.

Qiuhui Chen et al., "A B-Spline Approach for Empirical Mode Decompositions", Advances in Computational Mathematics, Springer, 2006, vol. 24, pp. 171-195.

Charles K. Chui et al., "Real-Time Dynamics Acquisition From Irregular Samples—With Application to Anesthesia Evaluation", Analysis and Applications, World Scientific Publishing Company, 2016, vol. 14, No. 4, pp. 537-590.

Charles K. Chui et al., "Signal Decomposition and Analysis via Extraction of Frequencies", Applied and Computational Harmonic Analysis, Elsevier, 2016, vol. 40, pp. 97-136.

Charles K. Chui et al., "Signal Analysis via Instantaneous Frequency Estimation of Signal Components", International Journal on Geomathematics, Springer-Verlag, 2015, vol. 6, pp. 1-42.

Ingrid Daubechies, "Ten Lectures on Wavelets", CBMS-NSF Regional Conference Series in Applied Mathematics, Society for Industrial and Applied Mathematics, 1992, Series 61.

Ingrid Daubechies et al., "Synchrosqueezed Wavelet Transforms: An Empirical Mode Decomposition-like Tool", Applied and Computational Harmonic Analysis, Elsevier, 2011, vol. 30, pp. 243-261.

Ingrid Daubechies et al., "A Nonlinear Squeezing of Continuous Wavelet Transform Based on Auditory Nerve Models", Wavelets in Medicine and Biology, CRC Press, 1996, pp. 527-546.

Olav B. Fosso et al., "Method for Mode Mixing Separation in Empirical Mode Decomposition", 2017, arXiv:1709.05547.

Qingtang Jiang et al., "Instantaneous Frequency Estimation Based on Synchrosqueezing Wavelet Transform", Signal Processing, Elsevier, 2017, vol. 138, pp. 167-181.

Lin Li et al., "Adaptive Synchrosqueezing Transform with a Time-Varying Parameter for Non-Stationary Signal Separation", Applied and Computational Harmonic Analysis, Elsevier, 2020, vol. 49, No. 3, pp. 1075-1106.

Thomas Oberlin et al., "Second-Order Synchrosqueezing Transform or Invertible Reassignment? Towards Ideal Time-Frequency Representations", IEEE Transactions on Signal Processing, Institute of Electrical and Electronics Engineers, 2015, vol. 63, No. 5, pp. 1335-1344.

Gaurav Thakur et al., "Synchrosqueezing-Based Recovery of Instantaneous Frequency from Nonuniform Samples", SIAM Journal on Mathematical Analysis, Society for Industrial and Applied Mathematics, 2011, vol. 43, No. 5, pp. 2078-2095.

Hau-Tieng Wu et al., "One or Two Frequencies? The Synchrosqueezing Answers", Advances in Adaptive Data Analysis, World Scientific Publishing Company, 2011, vol. 3, Nos. 1 & 2, pp. 29-39.

Haizhao Yang, "Synchrosqueezed Wave Packet Transforms and Diffeomorphism Based Spectral Analysis for 1D General Mode Decompositions", Applied and Computational Harmonic Analysis, Elsevier, 2015, vol. 39, pp. 33-66.

Jaizhao Yang et al., "Quantitative Canvas Weave Analysis Using 2D Synchrosqueezed Transforms", IEEE Signal Processing Magazine, Institute of Electrical and Electronics Engineers, 2015, vol. 32, No. 4, pp. 55-63.

Haizhao Yang et al., "Synchrosqueezed Wave Packet Transform for 2D Mode Decomposition", SIAM Journal on Imaging Sciences, Society for Industrial and Applied Mathematics, 2013, vol. 6, No. 4, pp. 1979-2009.

Haizhao Yang et al., "Synchrosqueezed Curvelet Transform for Two-Dimensional Mode Decomposition", SIAM Journal on Mathematical Analysis, Society for Industrial and Applied Mathematics, 2014, vol. 46, No. 3, pp. 2052-2083.

* cited by examiner

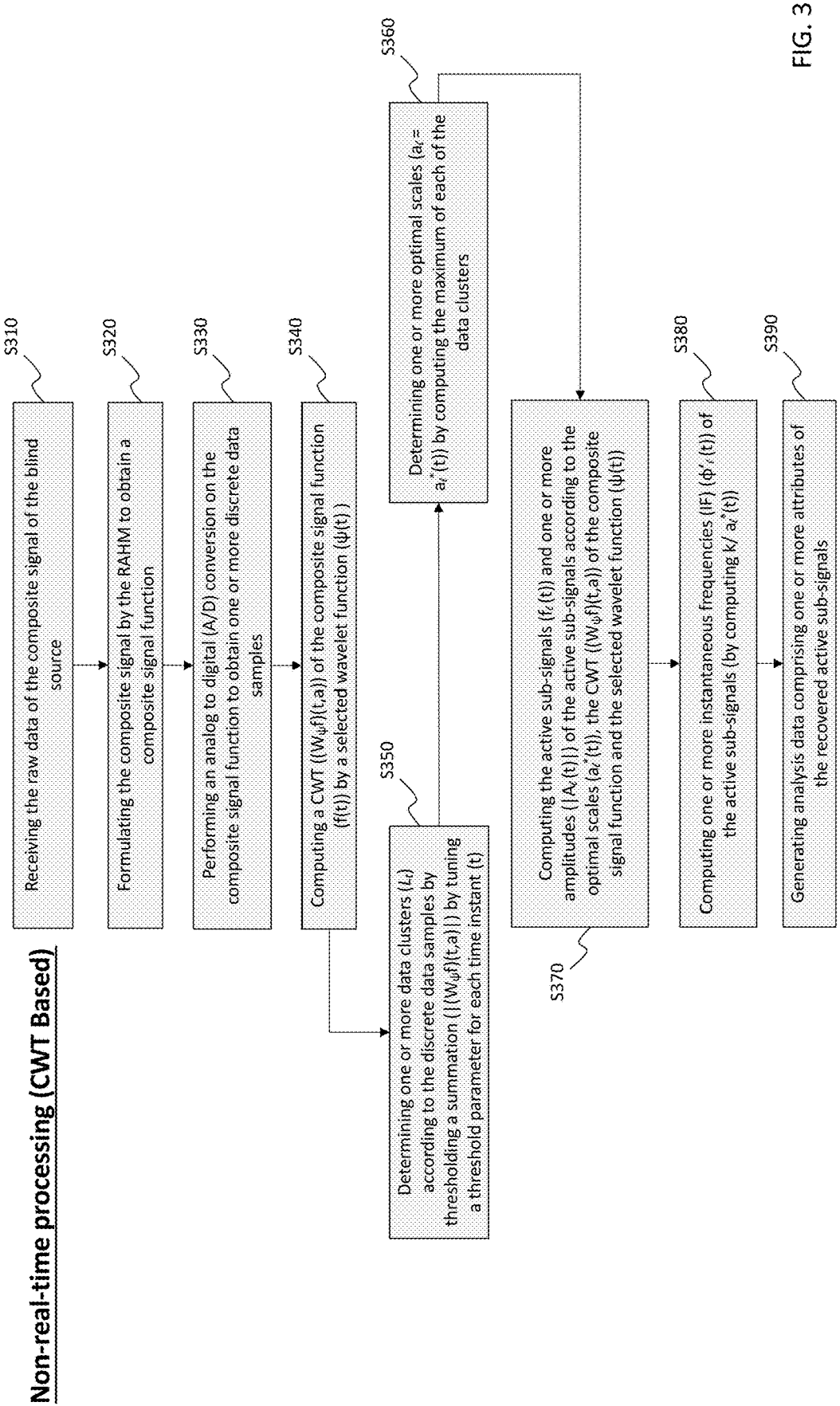

Example of the lookup table

|  | 1α | 2α | 3α |
|---|---|---|---|
| 1β | E1 | E2 | E3 |
| 2β | E4 | E5 | E6 |
| 3β | E7 | E8 | E9 |

T400

For 1≤k≤3

$E_{n,j}(k\alpha;k\beta)$: E1, E2, ..., E8, E9

METHOD AND DEVICE FOR RECOVERING SUB-SIGNALS FROM COMPOSITE SIGNAL OF BLIND SOURCE

FIELD OF THE INVENTION

The present invention generally relates to the field of signal analysis, and in particular, to a computer-implemented method and an analysis device for recovering one or more sub-signals from a composite signal of a blind source. More specifically, the present invention relates to techniques, devices and system to recover attributes of the sub-signals from the composite signal or components of a time series components, governed by a Realistic Adaptive Harmonic Model (RAHM), of the blind source.

BACKGROUND OF THE INVENTION

Many problems that arise from sensor arrays, stochastic control, mobile communication, and signal processing in general, are modeled by a linear combination of damped sinusoids with constant frequencies. Extension of this model from stationary signals (with constant frequencies) to non-stationary signals (with time-varying frequencies), governed by the Adaptive Harmonic model (AHM) in the mathematics literature (sometimes also called AM-FM model) is necessary for the state-of-the-arts applications, since most real-world composite signals consist of non-stationary sub-signals and just about all real-world time series are non-stationary. While there is no existing methods and systems for effective and acceptably accurate recovery of sub-signals of composite signals and components of time series from discrete data information acquired from the blind-source, conventional methods for signal and time series decompositions, such as discrete wavelet decomposition, are commonly used for this purpose. Such decomposition algorithms which are aimed at separating composite signals or time series into certain components are commonly used. However, these algorithms have very little to do with recovering the actual unknown sub-signals of a composite signal or components that constitute the time series.

SUMMARY OF THE INVENTION

An objective of this invention is to provide an improved model called Realistic Adaptive Harmonic Model (RAHM) for conventional AHM by allowing different times of signal arrival (or signal on-set) and signal departure (or signal off-set) for each sub-signal of the composite signal.

In accordance to one aspect of the present invention, a computer-implemented method for recovering one or more active sub-signals from a composite signal of a blind source is provided. The method includes: performing an offline preparing process to generate a lookup table of Continuous Wavelet Transform (CWT)-basic elements (WBEs); when receiving raw data of the composite signal of the blind source, performing a real-time process to recover the one or more active sub-signals of the composite signal according to the lookup table of WBEs by formulating the composite signal by a Realistic Adaptive Harmonic Model (RAHM); and generating analysis data comprising one or more attributes of the active sub-signals.

The method further includes: receiving the raw data of the composite signal of the blind source; formulating the composite signal by a Realistic Adaptive Harmonic Model (RAHM) to obtain a composite signal function; performing an analog to digital (A/D) conversion on the composite signal function to obtain one or more discrete data samples; computing a CWT of the composite signal function by a selected wavelet function; determining one or more data clusters according to the discrete data samples by thresholding a summation by tuning a threshold parameter for each time instant; determining one or more optimal scales by computing the maximum of each of the data clusters; computing the active sub-signals and one or more amplitudes of the active sub-signals according to the optimal scales, the CWT of the composite signal function and the selected wavelet function; computing one or more instantaneous frequencies of the active sub-signals; and generating analysis data comprising one or more attributes of the active sub-signals.

The method further includes: performing an offline preparing process to generate a lookup table of Short-Time Fourier Transform (STFT)-basic elements (SFBEs); when receiving raw data of a composite signal from a blind source, performing a real-time process to recover one or more active sub-signals of the composite signal according to the lookup table of SFBEs by formulating the composite signal by a Realistic Adaptive Harmonic Model (RAHM); and generating analysis data comprising one or more attributes of the active sub-signals.

The method further includes: receiving the raw data of the composite signal of the blind source; formulating the composite signal by a Realistic Adaptive Harmonic Model (RAHM) to obtain a composite signal function; performing an analog to digital (A/D) conversion on the composite signal function to obtain one or more discrete data samples; computing a STFT of the composite signal function with a frequency parameter; determining one or more data clusters according to the discrete data samples by thresholding a summation by tuning a threshold parameter and adjusting a scale parameter a for each time instant; determining one or more optimal frequency parameters by computing the maximum of each of the data clusters; computing the active sub-signals and one or more amplitudes of the active sub-signals according to the more optimal frequency parameters, an adjusted scale parameter and the STFT of the composite signal function; computing one or more instantaneous frequencies and one or more trends of the active sub-signals; and generating analysis data comprising one or more attributes of the active sub-signals.

The method further includes: performing an offline preparing process to generate a lookup table of Signal Separation operation (SSO)-basic elements (SSBEs); when receiving raw data of a composite signal from a blind source, performing a real-time process to recover one or more active sub-signals of the composite signal according to the lookup table of SSBEs by formulating the composite signal by a Realistic Adaptive Harmonic Model (RAHM); and generating analysis data comprising one or more attributes of the active sub-signals.

In accordance to another aspect of the present invention, an analysis device for recovering one or more active sub-signals from a composite signal of a blind source is provided. The analysis device includes: a data communication circuit unit, a non-transient memory circuit and a processor. Th data communication circuit unit is configured to receive raw data of the composite signal of the blind source. The non-transient memory circuit, configured to store machine instructions. The processor is configured to execute the machine instructions to implement a sub-signal recovering method. The sub-signals recovering method includes: performing, by the processor, an offline preparing process to generate a lookup table of Continuous Wavelet Transform (CWT)-basic elements (WBEs); when receiving raw data of the composite signal of the blind source, performing, by the processor, a real-time process to recover the one or more active sub-signals of the composite signal according to the lookup table of WBEs by formulating the composite signal by a Realistic Adaptive Harmonic Model (RAHM); and generating, by the processor, analysis data comprising one or more attributes of the active sub-signals.

BRIEF DESCRIPTION OF THE DRAWINGS

Embodiments of the invention are described in more details hereinafter with reference to the drawings, in which:

FIG. 3 depicts a flowchart of non-real-time sub-signals recovering method using the RAHM and CWT;

FIG. 4 depicts a schematic diagram illustrating a lookup table recording CWT-basic elements (WBEs);

DETAILED DESCRIPTION

In the following description, method and system for recovering one or more active sub-signals from a composite signal of a blind source and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
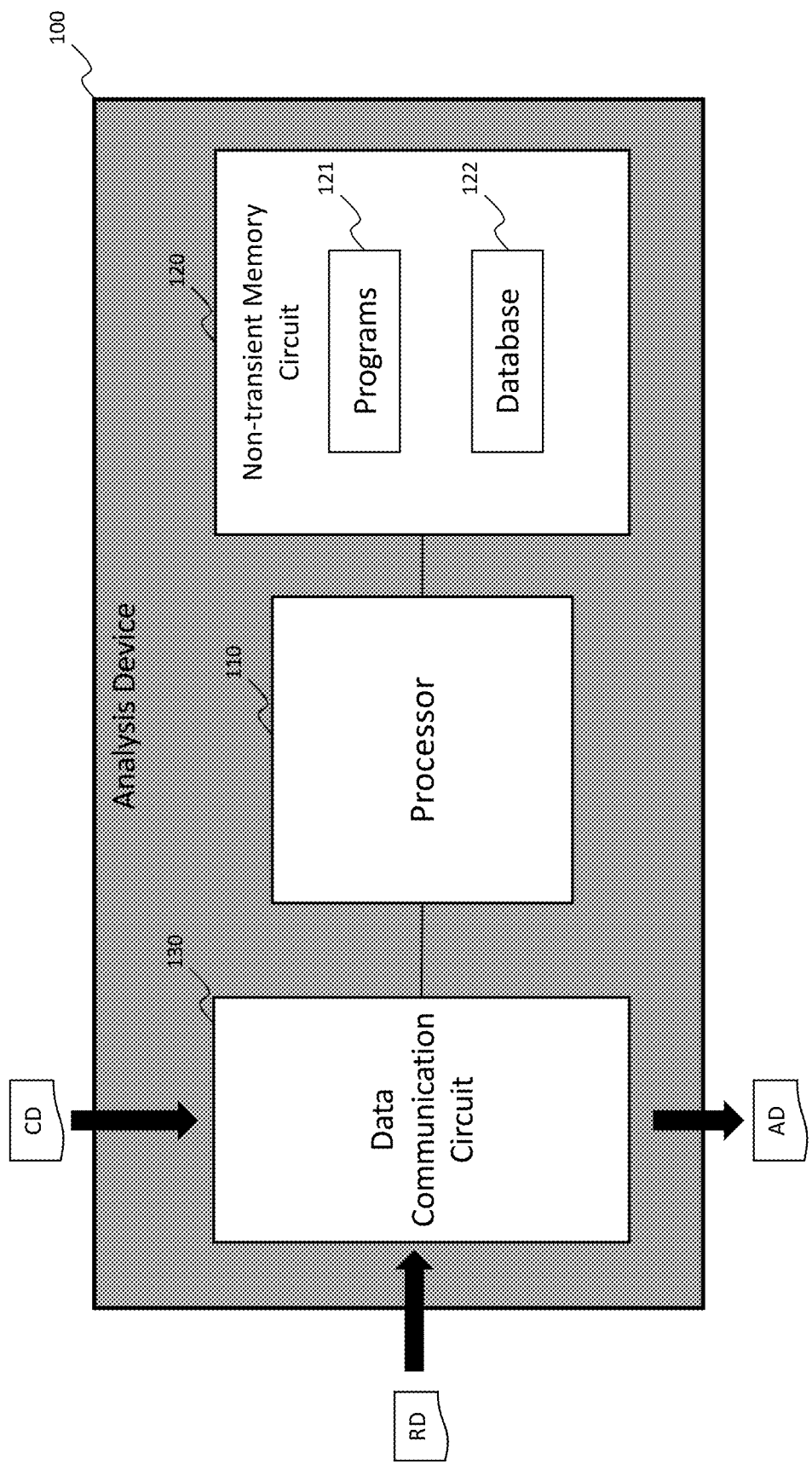
FIG. 1A depicts a block diagram illustrating an analysis device for recovering one or more active sub-signals from a composite signal of a blind source in accordance with one embodiment of the present invention.

Referring to FIG. 1A, in accordance to various embodiments of the present invention, an analysis device 100, for recovering one or more active sub-signals from a composite signal of a blind source, includes a processor 110, a non-transient memory circuit 120 and a data communication circuit 130. The "blind source" is an input signal, in which its sub-components/sub-signals are unknown.

The non-transient memory circuit 120 is configured to store programs 121 (or machine instructions 121) and to host the database 122. The database 122 may be used to store raw data RD, control data CD, and/or analysis data AD. The data communication circuit 130 is configured to establish the network connection(s) (not shown) for receiving the raw data RD and the control data CD, and a further network connection for sending the analysis data AD. In a further embodiment, the control data CD can be received from an input operation applied to (an I/O device of) the analysis device 100. The control data CD includes Expected AD range, Sampling rate, Sampling width and Sampling resolution.

The processor 110 executes the machine instructions 121 to implement methods provided by the presented disclosure.

Figure 1B:
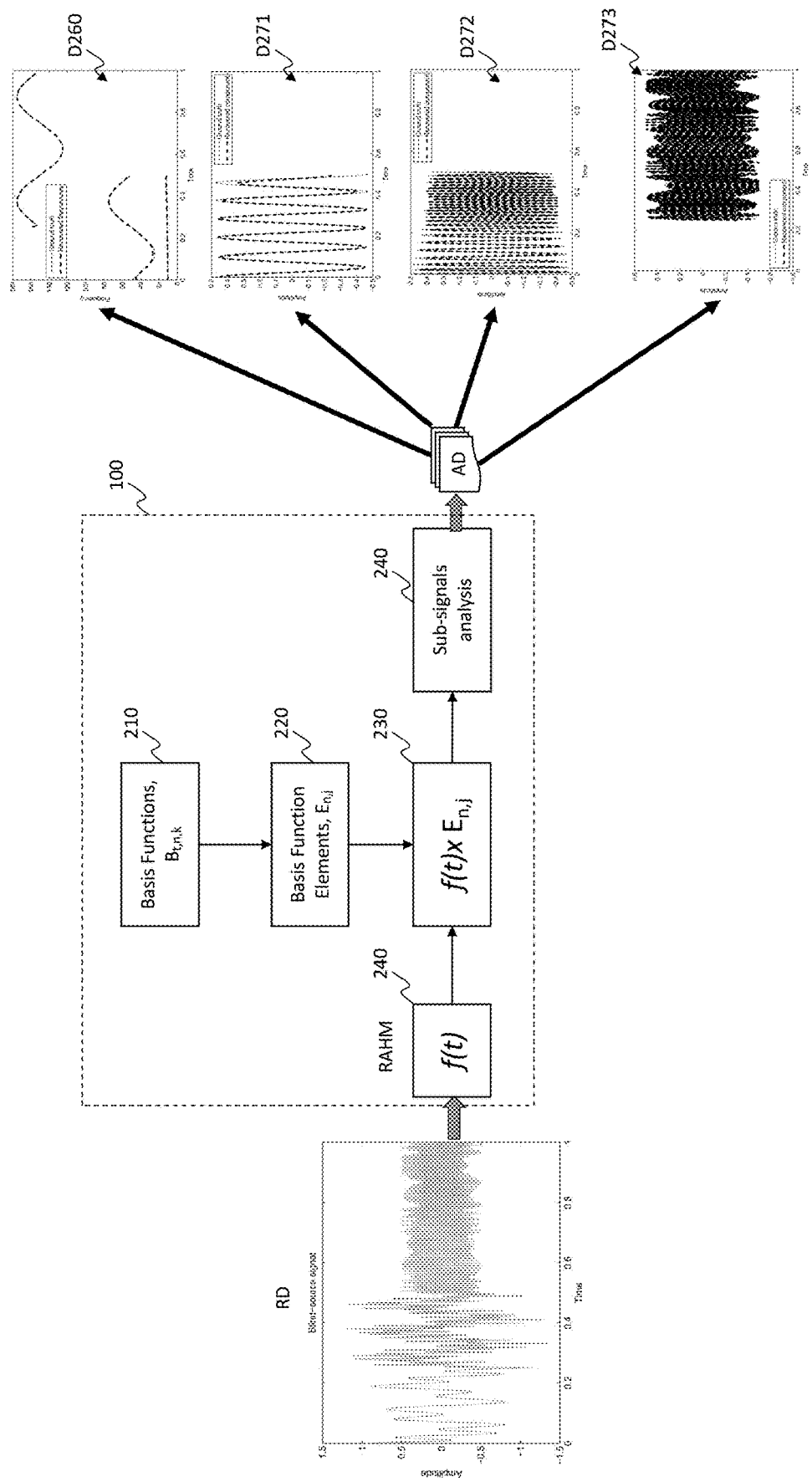
FIG. 1B depicts a schematic diagram illustrating the flow of obtaining attributes of recovered sub-signals from the composite signal of the blind source by resolving the composite signal via the RAHM.

Referring to FIG. 1B, for example, it is assuming that raw data having a composite sound signal (as called as the composite signal hereinafter) is sent to the analysis device 100. As illustrated by block 210, the analysis device 100 (or the processor 110) performs the Continuous Wavelet Transform (CWT) on the normalized B-spline basis functions $(N_{t,n,k}(t))$ to obtain the basis functions $(B_{t,n,k}^w(t;a))$. Then, as illustrated by block 220, the analysis device 100 computes CWT-Basic Elements (WBEs) $(E_{n,j}(t;a))$ according to the basis functions, but the invention is not limited hereto. For example, in other embodiments, the analysis device 100 computes other algorithm-basic elements (e.g., the Short-Time Fourier Transform (STFT)-basic elements, and the Signal Separation Operation (SSO)-basic elements) in block 220.

As illustrated by block 210, when receiving the raw data RD, the analysis device 100 formulates the composite signal of the raw data RD by a Realistic Adaptive Harmonic Model (RAHM) provided by the present disclosure, so as to obtain a composite signal function $(f(t))$. As illustrated by block 230, the analysis device 100 computes one or more summations corresponding to one or more data clusters of sub-signals according to the composite signal function and the CWT-Basic Elements. As illustrated by block 240, the analysis device 100 performs sub-signals analysis to computer one or more attributes of each of the sub-signals.

The analysis device 100 generates analysis data comprising the attributes of the sub-signals. The attributes of the sub-signals can be used to recover/rebuild the corresponding sub-signals, such as the recovered instantaneous frequencies with sub-signal time on-sets and off-sets illustrated by diagram D260, recovered sub-signals illustrated by diagrams D271 to D273.

The methods disclosed in this invention apply to detect the times of signal on-sets and signal off-sets of all sub-signals. More precisely, the composite signal would be formulated by the RAHM as the equation (1) (composite signal function) below.

$$f(t) = \Sigma_{l=1}^{L}(t)\cos \emptyset_l(t))X_{I_l}(t) \quad (1)$$

where $I_l$ denotes the disjoint union of open intervals $I_{l,j}=(u_{l,j}, v_{l,j})$, with signal on-set at $t=u_{l,j}$ and signal off-set at $t=v_{l,j}$ for $j=1, \ldots, n_l$, where $n_l$ denotes the number of times when the sub-signal $f_l(t)=A_l(t)\cos \emptyset_l(t)$ is active; $X_{I_l}(t)$ is the characteristic function of the open set $I_l$, wherein $X_{I_l}(t)$ is equal to 1 for $t \in I_l$, and $X_{I_l}(t)$ is equal to 0 for t does not belong to $I_l$. Therefore, by multiplying the composite signal function $f(t)$ with the characteristic function $X_{I_l}(t)$ assures the precise time durations when each sub-signal is active, with positive instantaneous frequencies (IFs) between signal on-sets and signal off-sets (that is, for $t \in I_l = (u_{l,j}, v_{l,j})$, for all j.

Furthermore, the invention addresses the inverse problem of recovering number, L, of sub-signals, the active sub-signals, the times of signal on-set and off-set (e.g., all the sub-intervals), as well as the Ifs ($\varphi'_l(t)$), for all l=1, ..., L (while the sub-signal is active), by using only discrete data information, which may be non-uniformly spaced.

The method and system of the invention can be separated into two stages (e.g., FIGS. 2A to 2B, 5A to 5B, and 7A to 7B): (1) off-line preparation, and (2) real-time processing. In addition, the method and system also apply to non-real-time process (e.g., FIGS. 3 and 6) if the continuous-time blind-source composite signal or time series is available. In the non-real-time process, the latencies for analyzing sub-signals can be ignored.

Figure 2A:
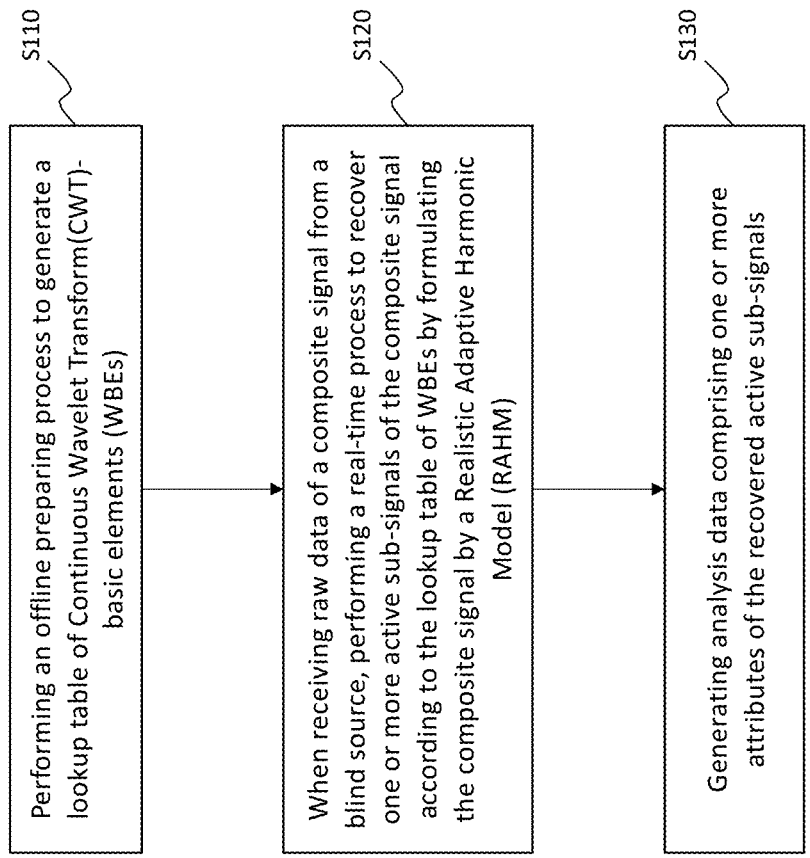
FIG. 2A depicts a flowchart of sub-signals recovering method using the RAHM and Continuous Wavelet Transform (CWT) in accordance with one embodiment of the present invention.

Referring to FIG. 2A, in step S110, the processor 110 performs an offline preparing process to generate a lookup table of Continuous Wavelet Transform (CWT)-basic elements (WBEs).

No data information is needed for this stage, with the exception of the time locations where the data samples are to be acquired. For uniform sampling, the only information needed is the sampling rate, say $\partial > 0$. Let t: ... $<t_j<t_{j+1}<$ ... denotes the sampling time locations. For uniform sampling, let $t_j = j\delta$, for all integers j. Consider the normalized $n^{th}$ order B-spline basis functions $N_{t,n,k}(t)$ on the knot sequence t, for all integers k, where n≥2. For each integer k, the linear functional $\lambda_k$, on the space of continuous functions, is defined by a finite linear combination of the function values $g(t_j)$, of a continuous function g(t), with coefficients $b_{k,j}$ (where the summation of the linear combination is over j). The totality of all the linear functionals $\lambda_k$ is said to yield a quasi-interpolation operator $Q_n$, if $(Q_n g)(t)$, defined by a finite linear combination of the B-splines, $N_{t,n,k}(t)$ with coefficients $\lambda_k(g)$, preserves all polynomials of degree n−1; meaning that $(Q_n g)(t)=p(t)$ for all polynomials p(t) of degree less than n.

For non-uniformly spaced knot sequence t, quasi-interpolation operators are linear operators that can be formulated as equation (2) below.

$$(Q_{s,t}g)(t)=\Sigma_j \beta_j(g) N_{t,s,j}(t) \quad (2)$$

Where $\beta=\{\beta_j\}$ is a finitely supported linear functional on the space of continuous functions, such that $(Q_{s,t}p)(t)=p(t)$ for all polynomials p(t) of degree less than s. By applying the quasi-interpolation operator in equation (2), a desired spline representation is formulated by the equation (3) below.

$$S_g(t)=(Q_{s,t}g)(t)=\Sigma_j\{\Sigma_{l=0}^{s-1} a_{j,l-s+1} g(t_l)\} N_{s,t,j}(t) \quad (3)$$

For the more general complex-valued $f(t)$ governed by RAHM, the real-valued g(t) in equation (3) can be replaced to arrive at the same formula for SAO. For the Cardinal B-splines $N_{2r}(t)=M_{2r}(t+r)$ with r≥1, for example, for cubic and quintic splines with r=2 and 3, respectively, the desired spline representations are formulated by the equation (4) and (5) below.

$$(S_f)(t) = \quad (4)$$

$$(Q_{4,\delta}f)(t) := \sum_j \frac{1}{3!}(-f((j+1)\delta)+8f(j\delta)-f((j-1)\delta))N_4\left(\frac{t}{\delta}+2-j\right)$$

$$(S_f)(t) = \quad (5)$$

$$(Q_{6,\delta}f)(t) := \sum_j \frac{1}{(5!)^2}\{f((j+4)\delta)+52f((j+3)\delta)+448f((j+2)\delta)-5876f((j+1)\delta)+25150f(j\delta)-5876f((j-1)\delta)+$$

-continued
$$448f((j-2)\delta)+52f((j-3)\delta)+f((j-1)\delta)\}N_6\left(\frac{t}{\delta}+3-j\right)$$

Equation (4) or (5) can be used in the steps S126 in FIG. 2B below, for computing (or simulating) transformed signal.

Figure 2B:
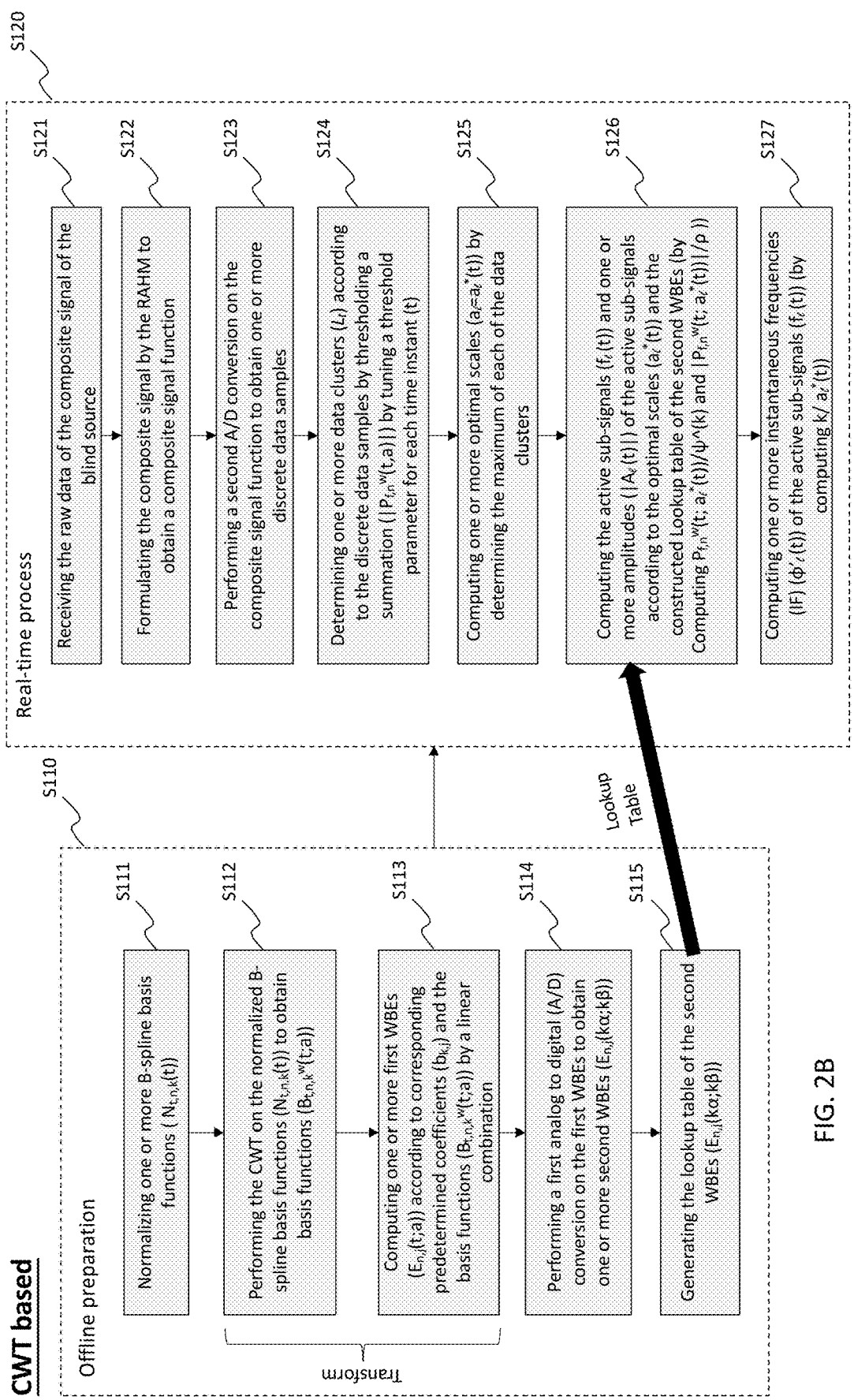
FIG. 2B depicts a flowchart of steps S110 and S120 in FIG. 2A.

Referring to FIG. 2B, during the offline preparation, in step S111, the processor 110 normalizes one or more B-spline basis functions ($N_{t,n,k}(t)$). For example, the B-spline basis elements can be presented by the equation (6) below.

$$B_{i,0}(x) = 1, \text{ if } t_i \le x < t_{i+1}, \text{ otherwise } 0, \quad (6)$$

$$B_{i,k}(x) = \frac{x-t_i}{t_{i+k}-t_i}B_{i,k-1}(x) + \frac{t_{i+k+1}-x}{t_{i+k+1}-t_{i+1}}B_{i+1,k-1}(x)$$

And, the B-spline basis functions, $N_{t,n,k}(t)$ can be presented by the equation (7) below.

$$N_{n,t,k}(t):=(T_{n+k}-t_k)[t_k, \ldots, t_{n+k}](\cdot-t)_+^{n-1}, \quad (7)$$

Next, in step S112, the processor 110 performs the Continuous Wavelet Transform (CWT) on the normalized B-spline basis functions $N_{t,n,k}(t)$ to obtain basis functions ($B_{t,n,k}^w(t;a)$). For the CWT, any wavelet function $\psi=\psi_n$, for any integer n≥4, defined by the $n^{th}$ ordered derivative of the cardinal B-spline $M_{2n}(t)$ of order 2n (e.g., polynomial degree 2n−1). Here, $M_{2n}(t)$ is defined by the 2n-fold integral convolution of the characteristic function $X_{[0,1)}$ of the unit interval [0,1). In general, the following CWT (also called as integral wavelet transform) of the normalized $N_{t,n,k}(t)$ is computed by the equation (8) below.

$$W_\psi N_{t,n,k}(t, a) = \frac{1}{a}\int_{-\infty}^{+\infty}\psi\left(\frac{x-t}{a}\right)N_{t,n,k}(x)dx \quad (8)$$

Yielding a family of basis functions $B_{t,n,k}^w(t;a)$, where a>0 denotes the scale of the CWT. Where, W denotes Wavelet transform; x denotes location.

Next, in step S113, the processor 110 computes one or more first WBEs ($E_{n,j}(t;a)$) according to corresponding predetermined coefficients ($b_{k,j}$) and the basis functions ($B_{t,n,k}^w(t;a)$) by a linear combination. For each integer j, the $j^{th}$ WBE, denoted by $E_{n,j}(t;a)$, is defined by the linear combination of basis functions $B_{t,n,k}^w(t;a)$ with predetermined coefficients $b_{k,j}$, where the summation of the linear combination is over k. For example, assuming that the predetermined coefficients $b_{k,j}=[-\frac{1}{6}, 8/6, -\frac{1}{6}]$, then $E_{n,j}(t;a)=(-\frac{1}{6})*B_{t,n,k-1}^w(t;a)+(8/6)*B_{t,n,k}^w(t;a)+(-\frac{1}{6})*B_{t,n,k+1}^w(t;a)$.

Next, in step S114, the processor 110 performs a first analog to digital (A/D) conversion on the first WBEs to obtain one or more second WBEs ($E_{n,j}(k\alpha;k\beta)$) (e.g., digitized first WBEs). The "$\alpha$" and "$\beta$" are the length/width of intervals. The k is the numbers of the intervals.

Next, in step S115, the processor 110 generates the lookup table of the second WBEs ($E_{n,j}(k\alpha;k\beta)$). For example, referring to FIG. 4, assuming that k=1, ..., and 3, and the values of the digitized WBEs $E_{n,j}(k\alpha;k\beta)$ are E1, E2, ..., E8, and E9. The processor 110 generates the lookup table T400 according to the digitized WBEs $E_{n,j}(k\alpha;k\beta)$.

Back to FIG. 2A, in step S120, when receiving raw data of a composite signal from a blind source, the processor 110 performs a real-time process to recover one or more active sub-signals of the composite signal according to the lookup table of WBEs (generated in step S110) by formulating the composite signal by a Realistic Adaptive Harmonic Model (RAHM).

Specifically, referring to FIG. 2B, whenever the processor 110 receives the raw data, the processor 110 performs the process comprising steps S121 to S127 in real-time.

In step S121, the processor 110 receives the raw data of the composite signal of the blind source. Next, in step S122, the processor 110 formulates the composite signal by the RAHM to obtain a composite signal function $f(t)$ as presented by equation (1). Furthermore, it is supposed that a sufficiently dense set of data $f(t_j)$: . . . <$t_j$<$t_{j+1}$< . . . of data samples is available, where the samples is available, where the sampling time locations may be non-uniformly spaced.

Next, in step S123, the processor 110 performs a second A/D conversion on the composite signal function to obtain one or more discrete data samples. Next, in step S124, the processor 110 determines one or more data clusters ($L_t$) according to the discrete data samples by thresholding a summation $|P_{f,n}^w(t,a)|$ by tuning a threshold parameter for each time instant (t).

Next, in step S125, the processor 110 computes one or more optimal scales ($a_j$—$a_j$*(t)) by determining the maximum of each of the data clusters. After the decomposition, multiple "a" would come from same sub-signal source. Therefore, these "a" corresponding to the same sub-signal are put into the same cluster.

Let $\psi(\omega)$ denotes its Fourier transform, and consider $\rho$—max$|\psi\hat{}(\omega)|$ with maximum attained at $\omega$=k, where k is the smallest positive value. It turns out that for $\omega_n\hat{}$, the value of k, determined by the equation $$\tan \frac{\omega}{2} = \omega,$$

is independent of n. For convenience, the approximate value 2.3311 can be used for k.

Given the $j^{th}$ discrete data sample $f(t_j)$ of the blind-source $f(t)$, the processor 110 formulates the finite sum by the equation (9) below.

$$P_{f,n}^w(t;a) := \Sigma_j f_{t_j} E_{n,j}(t;a) \quad (9)$$

For each time instant t, thresholding a summation $|P_{f,n}^w(t;a)|$, by tuning the thresholding parameter (which is at least equal to $\rho$/2 multiple of the lower bound of the unknown sub-signal amplitudes) gradually to extract (the largest number) $L_t$ clusters, where $L_t \leq L$ is the number of active sub-signals of the composite signal at the time instant t. If all sub-signals are active, then $L_t$=L. For some applications, the thresholding parameter can be learned by training data. Determine the optimal scale $a_j$=$a_j$*(t), by computing the maximum of each of the $L_t$ clusters.

In step S126, the processor 110 computes the active sub-signals ($f_l(t)$) and one or more amplitudes ($|A_l(t)|$) of the active sub-signals according to the optimal scales ($a_l$*(t)) and the constructed Lookup table of the second WBEs (e.g., the values of digitized WBEs).

For each time instant t, the optimal scale is used as input to the threshold-ed summation $P_{f,n}^w(t;a)$ to yield the active sub-signals $f_l(t)$ and its amplitude $|A_l(t)|$, by computing $P_{f,n}^w(t; a_l$*(t))/$\psi\hat{}(k)$ and $|P_{f,n}^w(t; a_l$*(t))|/$\rho$, respectively. The $\rho$ is a predefined constant. The second WBEs in the lookup table are used as the $E_{n,j}(t;a)$ during the calculation of the $P_{f,n}^w(t;a)$ (e.g., equation (9)).

Next, in step S127, the processor 110 computes one or more instantaneous frequencies (IF) ($\varphi'_l(t)$) of the active sub-signals $f_l(t)$ by computing k/$a_l$*(t). The preferred wavelet function $\psi(t)$ is $\psi_n(k)$, for any n≥4, with k approximated for example by 2.3311.

Referring again to FIG. 2A in the following description. In step S130, the processor 110 generates analysis data comprising one or more attributes of the recovered active sub-signals. The analysis data can further include related auxiliary information.

In another embodiment, for certain applications, particularly for resolving the components of a non-stationary time series, the real-time processing may not be the priority. In this case, it could be preferable to skip the foregoing off-line preparation procedure. However, the non-real-time process requires full (continuous-time) data information of the blind source composite signal $f(t)$, for all t.

During the non-real-time process, any wavelet function $\psi(t)$ with finite time-duration can be chose. Then, the continuous wavelet transform $(W_\psi f)(t,a)$ of $f(t)$ is computed. For each time instant t, thresholding a summation $|(W_\psi f)(t,a)|$ by tuning the thresholding parameter (which is at least equal to $\rho$/2 multiple of the lower bound of the unknown sub-signals amplitudes) gradually to extract (the largest number) $L_t$ clusters, where $L_t \leq L$ is the number of active sub-signals of the composite signal at the time instant t. If all sub-signals are active, then $L_t$=L. Then, the processor 110 determines the optimal scale $a_j$=$a_j$*(t), by computing the maximum of each of the $L_t$ clusters.

To recover the active sub-signals (or active components), the optimal scale $a_j$=$a_j$*(t) is used as input to the thresholded summation $|(W_\psi f)(t,a)|$ to yield the active sub-signals $f_l(t)$ and its amplitude $|A_l(t)|$ by computing $(W_\psi f)(t,a_l$*(t))/$\psi\hat{}(k)$ and $|(W_\psi f)(t,a_l$*(t))|/$\rho$, respectively. The instantaneous frequency (IF) ($\varphi'_l(t)$) of the active sub-signals $f_l(t)$ is obtained by computing k/$a_l$*(t).

Referring to FIG. 3, in step S310, the processor 110 receives the raw data of the composite signal of the blind source. Next, in step S320, the processor 110 formulates the composite signal by the RAHM to obtain a composite signal function $f(t)$. Next, in step S330, the processor 110 performs an analog to digital (A/D) conversion on the composite signal function to obtain one or more discrete data samples. Next, in step S340, the processor 110 computes a CWT $(W_\psi f)(t,a)$ of the composite signal function $f(t)$ by a selected wavelet function $\psi(t)$.

Next, in step S350, the processor 110 determines one or more data clusters ($L_t$) according to the discrete data samples by thresholding a summation $|(W_\psi f)(t,a)|$ by tuning a threshold parameter for each time instant t. Next, in step S360, the processor 110 determines one or more optimal scales ($a_j$=$a_j$*(t)) by computing the maximum of each of the data clusters. Next, in step S370, the processor 110 computes the active sub-signals $f_l(t)$ and one or more amplitudes $|A_l(t)|$ of the active sub-signals according to the optimal scales $a_l$*(t), the CWT $(W_\psi f)(t,a)$ of the composite signal function and the selected wavelet function $\psi(t)$. The active sub-signals $f_l(t)$ is obtained by computing by $(W_\psi f)(t;a_l$*(t))/$\psi\hat{}(k)$, and amplitudes $|A_l(t)|$ is obtained by computing $|(W_\psi f)(t;a_l$*(t))|/$\rho$.

Next, in step S380, the processor 110 computes one or more instantaneous frequencies (IF) ($\varphi'_l(t)$) of the active sub-signals. The IF is obtained by computing k/$a_l$*(t). Next, in step S390, the processor 110 generates analysis data comprising one or more attributes of the recovered active sub-signals.

In addition to the CWT-based sub-signal recovery method, a Short-Time Fourier Transform (STFT)-based sub-signal recovery method is provided by a further embodiment described below with FIGS. 5A, 5B and 6.

Figure 5A:
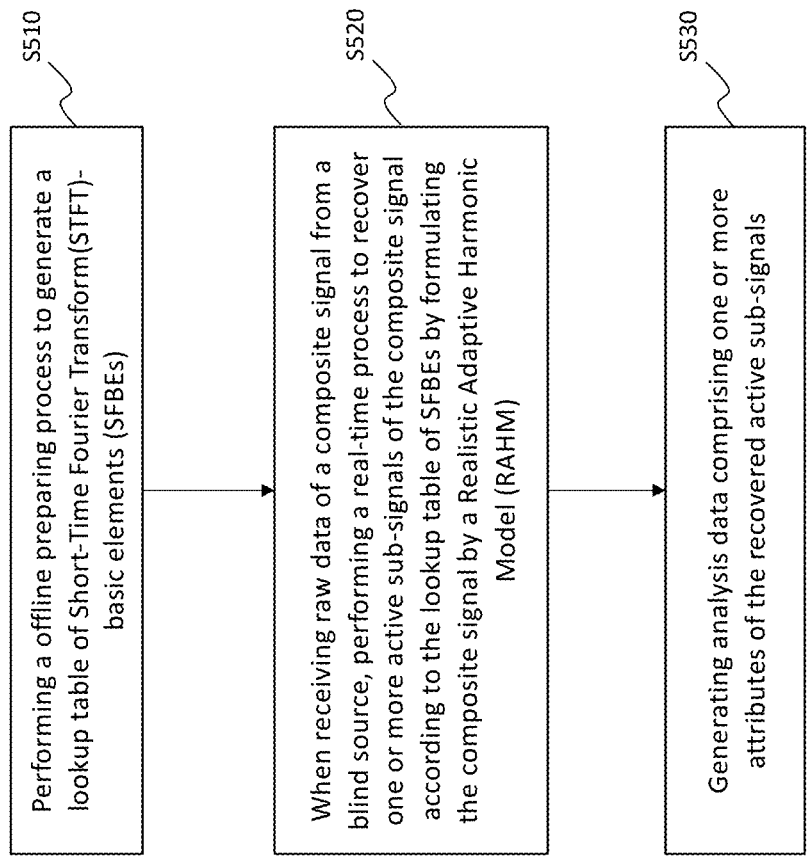
FIG. 5A depicts a flowchart of sub-signals recovering method using the RAHM and Short-Time Fourier Transform (STFT) in accordance with one embodiment of the present invention.

Referring to FIG. 5A, in step S510, the processor 110 Performing a offline preparing process to generate a lookup table of Short-Time Fourier Transform (STFT)-basic elements (SFBEs). Here, Let a>0 denotes the window width of the STFT. Then, applying this STFT to the normalized B-splines $N_{t,n,k}(t)$, followed by frequency modulation, with frequency parameter θ. This yields a two-parameter family $B_{t,n,k}{}^{sf}(t;θ,a)$. Then for each integer j, the $j^{th}$ SFBE, to be denoted by $D_{n,j}(t;θ,a)$, is defined by the linear combination of basis functions $B_{t,n,k}{}^{sf}(t;θ,a)$ with predetermined coefficients $B_{k,j}$, where the summation of the linear combination is over k.

Figure 5B:
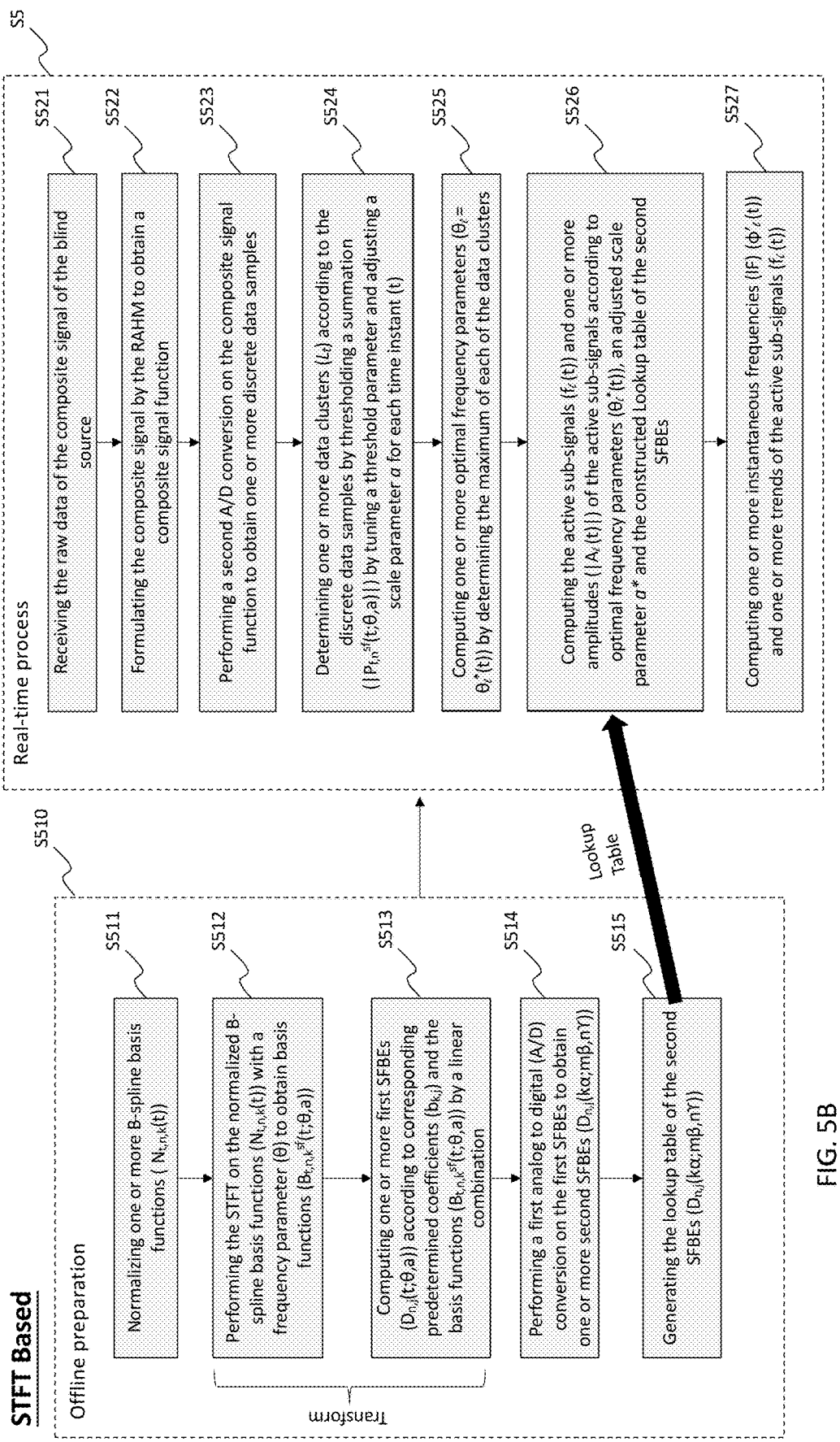
FIG. 5B depicts a flowchart of steps S510 and S520 in FIG. 5A.

Referring to FIG. 5B in the following description. In step S511, the processor 110 normalizes one or more B-spline basis functions $N_{t,n,k}(t)$. Next, in step S512, the processor 110 performs the STFT on the normalized B-spline basis functions ($N_{t,n,k}(t)$) with a frequency parameter (θ) to obtain basis functions ($B_{t,n,k}{}^{sf}(t;θ,a)$).

Next, in step S513, the processor 110 computes one or more first SFBEs $D_{n,j}(t;θ,a)$ according to corresponding predetermined coefficients $b_{k,j}$ and the basis functions $B_{t,n,k}{}^{sf}(t;θ,a)$ by a linear combination.

Next, in step S514, the processor 110 performs a first analog to digital (A/D) conversion on the first SFBEs to obtain one or more second SFBEs $D_{n,j}(kα;mβ,nγ)$. Next, in step S515, the processor 110 generates the lookup table of the second SFBEs $D_{n,j}(kα;mβ,nγ)$.

Referring again to FIG. 5A in the following description. In step S520, when receiving raw data of a composite signal from a blind source, the processor 110 performs a real-time process to recover one or more active sub-signals of the composite signal according to the lookup table of SFBEs by formulating the composite signal by a Realistic Adaptive Harmonic Model (RAHM).

Referring to FIG. 5B in the following description. Specifically, in step S521, the processor 110 receives the raw data of the composite signal of the blind source. Next, in step S522, the processor 110 formulates the composite signal by the RAHM to obtain a composite signal function $f(t)$. Next, in step S523, the processor 110 performs a second A/D conversion on the composite signal function to obtain one or more discrete data samples.

Given the $j^{th}$ discrete data sample $f(t_j)$ of the blind-source $f(t)$, the processor 110 formulates the finite sum by the equation (10) below.

$$P_{f,n}{}^{sf}(t;θ,a):=\Sigma_j f_{t_j} D_{n,j}(t;θ,a) \quad (10)$$

For each time instant t, thresholding a summation $|P_{f,n}{}^{sf}(t;θ,a)|$, by adjusting the scale parameter a to some desired a* and tuning the thresholding parameter gradually to extract (the largest number) $L_t$ clusters in the time-frequency domain, where $L_t \leq L$ is the number of active sub-signals of the composite signal at the time instant t (Step S524).

Next, in step S525, the processor 110 computes one or more optimal frequency parameters ($θ_l = θ_l^*(t)$) by determining the maximum of each of the data clusters.

For each time instant t, the optimal frequency parameters $θ_l^*(t)$ is used as input to the threshold-ed summation $|P_{f,n}{}^{sf}(t;θ,a^*)|$ to yield the active sub-signals $f_l(t)$ and its amplitude $|A_l(t)|$ (Step S526), by computing the real part and absolute value of $2 \times P_{f,n}{}^{sf}(t;θ_l^*(t),a^*)$, respectively, for each l=1, . . . , L. The second WBEs in the lookup table are used as the $D_{n,j}(t;θ,a)$ during the calculation of the $P_{f,n}{}^{sf}(t;θ,a)$ (e.g., equation (10)).

Next, in step S527, the processor 110 computes one or more instantaneous frequencies (IF) ($φ'_l(t)$) and one or more trends of the active sub-signals $f_l(t)$. The trends are computed by using θ=0 as an input to $P_{f,n}{}^{sf}(t;θ,a^*)$, where a* is the adjusted desired scale parameter. The "trends" here indicate the signal direction. In FinTech, it can be up-trend or down-trend.

Referring again to FIG. 5A in the following description. In step S530, the processor 110 generates analysis data comprising one or more attributes of the recovered active sub-signals.

In another embodiment, in the non-real-time process, the STFT has a window width a>0. The STFT is then applied to the blind source $f(t)$, followed by frequency modulation with frequency parameter θ. This yields a two-parameter family $(Tf)(t;θ,a)$ for recovering the sub-signals.

Figure 6:
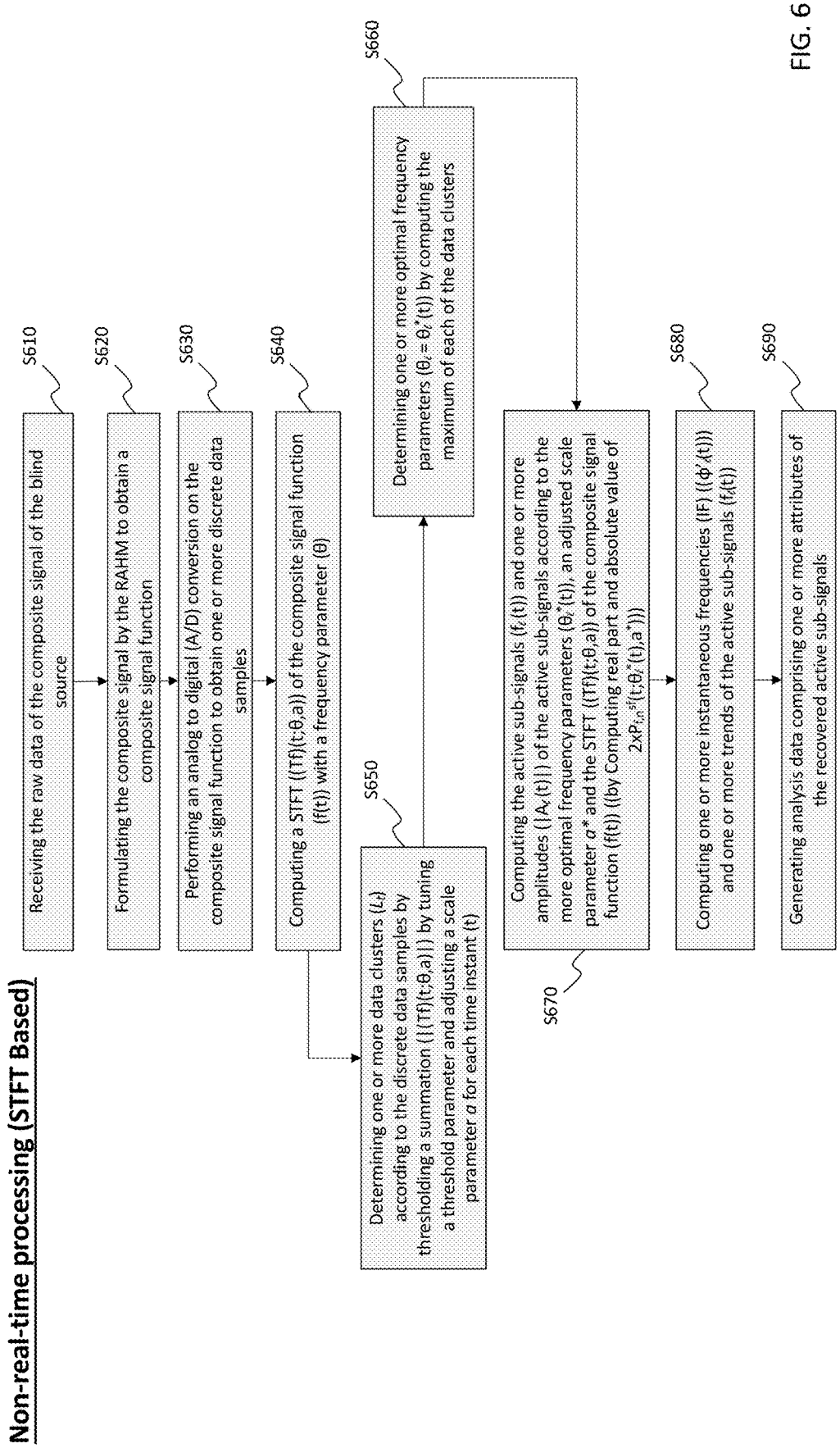
FIG. 6 depicts a flowchart of non-real-time sub-signals recovering method using the RAHM and STFT.

Referring to FIG. 6 in the following description. In step S610, the processor 110 receives the raw data of the composite signal of the blind source. Next, in step S620, the processor 110 formulates the composite signal by the RAHM to obtain a composite signal function $f(t)$. Next, in step S630, the processor 110 performs an analog to digital (A/D) conversion on the composite signal function to obtain one or more discrete data samples.

Next, in step S640, the processor 110 computes a STFT $(Tf)(t;θ,a)$ of the composite signal function $f(t)$) with a frequency parameter θ.

Next, in step S650, the processor 110 determines one or more data clusters ($L_t$) according to the discrete data samples by thresholding a summation $|(Tf)(t;θ,a)|$ by tuning a threshold parameter and adjusting a scale parameter a for each time instant (t), so as to extract (the largest number) $L_t$ data clusters in the time-frequency domain, where $L_t \leq L$ is the number of active sub-signals of the composite signal at the time instant t.

Next, in step S660, the processor 110 determines one or more optimal frequency parameters ($θ_l = θ_l^*(t)$) by computing the maximum of each of the data clusters. Then, $θ_l^*(t)$ is used as the desired estimation of the IF $φ'_l(t)$ at t, for each l=1, . . . , L.

Next, in step S670, the processor 110 computes the active sub-signals $f_l(t)$ and one or more amplitudes ($|A_l(t)|$) of the active sub-signals according to the more optimal frequency parameters $θ_l^*(t)$, an adjusted scale parameter a* and the STFT $(Tf)(t;θ,a)$ of the composite signal function $f(t)$. The optimal frequency parameter $θ_l^*(t)$ is used as input to the threshold-ed summation $|(Tf)(t;θ^*,a^*)|$ to yield the active sub-signals $f_l(t)$ and its amplitude ($|A_l(t)|$) by computing real part and absolute value of $2 \times P_{f,n}{}^{sf}(t;θ_l^*(t),a^*)$, respectively, for each l=1, . . . , L. Next, in step S680, the processor 110 computes one or more instantaneous frequencies (IF) ($φ'_l(t)$) and one or more trends of the active sub-signals $f_l(t)$. The trends are computed by using θ=0 as an input to $P_{f,n}{}^{sf}(t;θ,a^*)$, where a* is the adjusted desired scale parameter.

Next, in step S690, the processor 110 generates analysis data comprising one or more attributes of the recovered active sub-signals.

In addition to the STFT-based sub-signal recovery method, a Signal Separation Operator (SSO)-based sub-signal recovery method is provided by a further embodiment described below with FIGS. 7A and 7B.

Figure 7A:
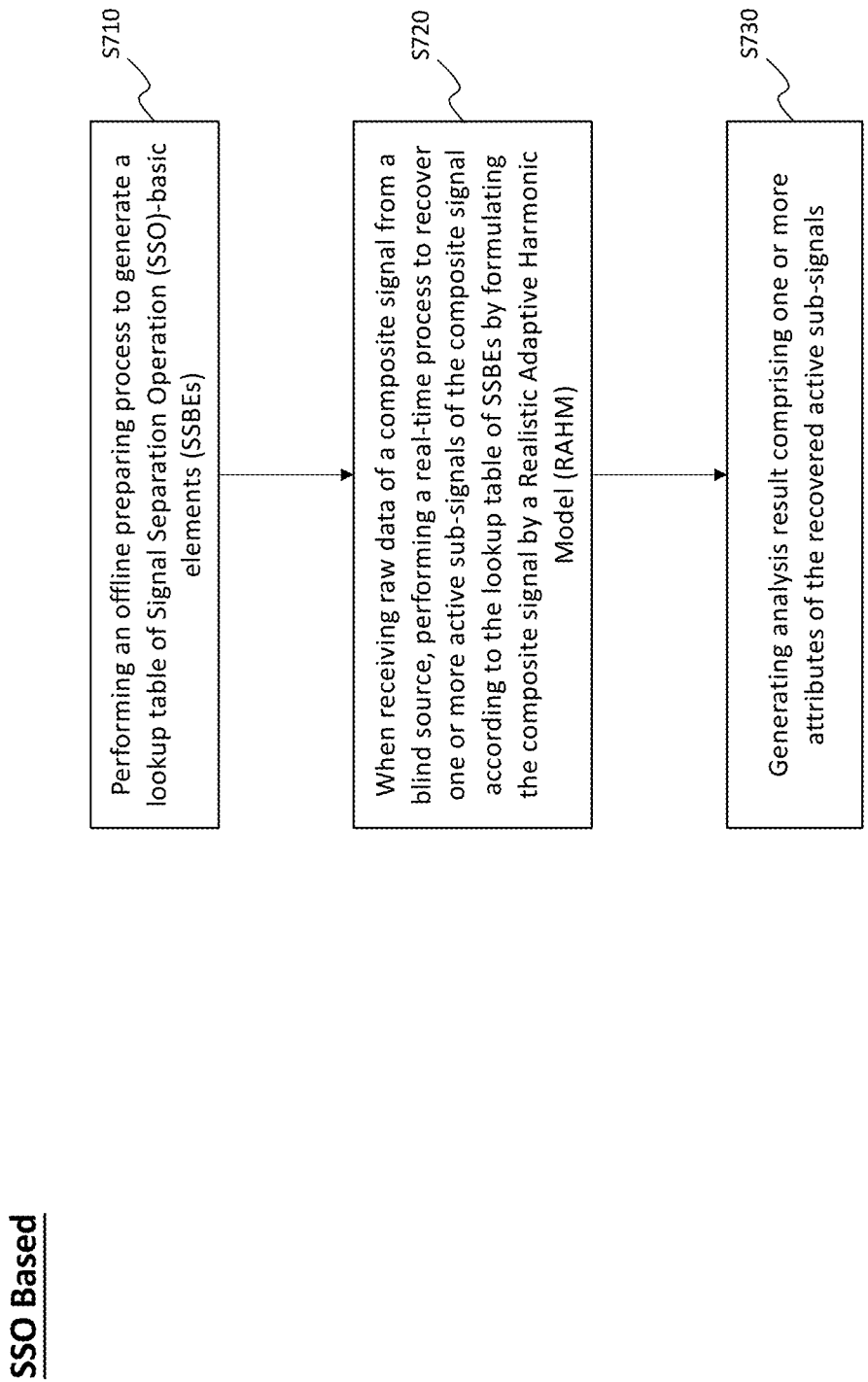
FIG. 7A depicts a flowchart of sub-signals recovering method using the RAHM and Signal Separation Operation (SSO) in accordance with one embodiment of the present invention.

Referring to FIG. 7A, in step S710, the processor 110 performs an offline preparing process to generate a lookup table of Signal Separation Operation (SSO)-basic elements (SSBEs).

Figure 7B:
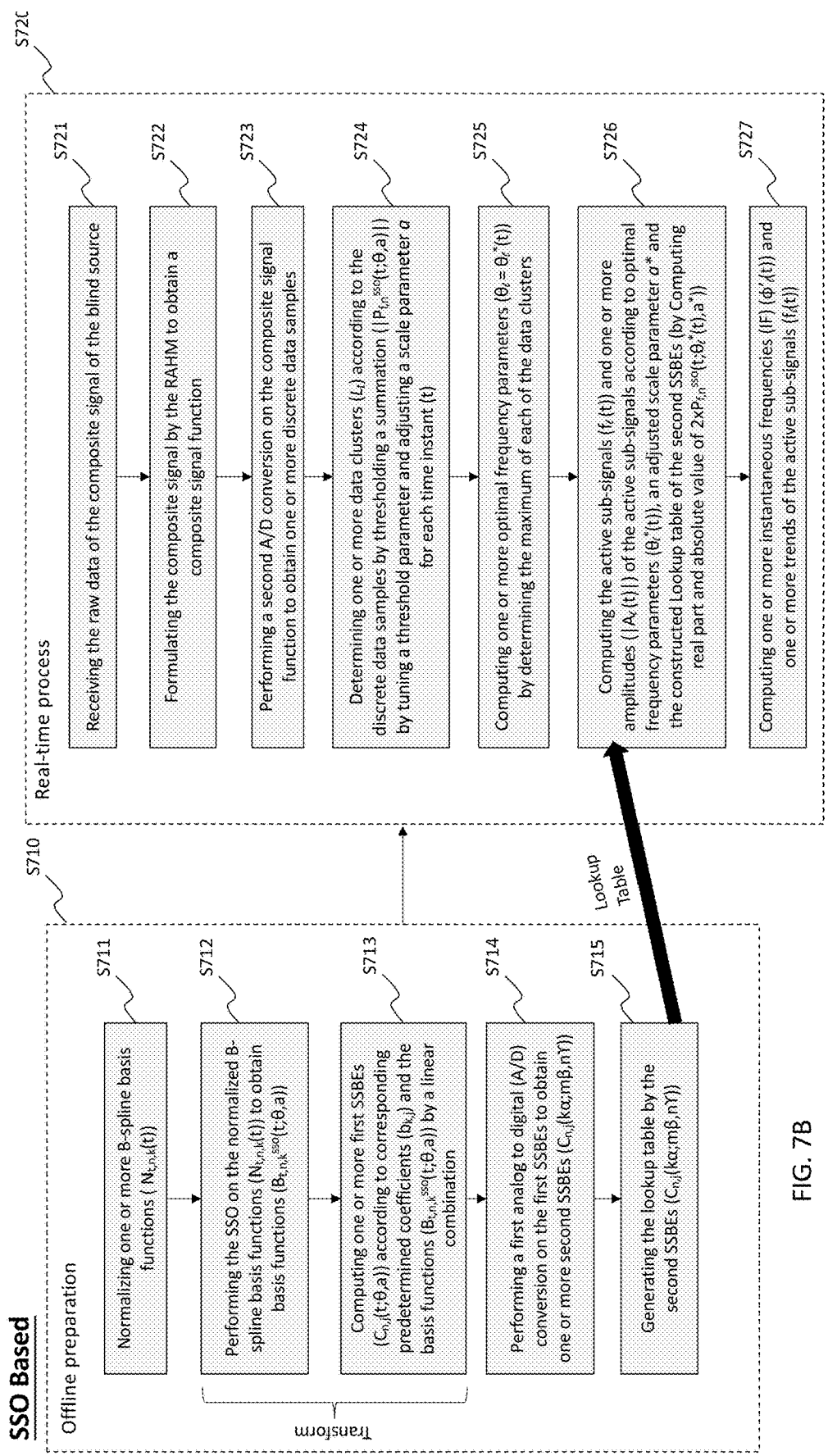
FIG. 7B depicts a flowchart of steps S710 and S720 in FIG. 7A.

Specifically, referring to FIG. 7B, in step S711, the processor 110 normalizes one or more B-spline basis functions $N_{t,n,k}(t)$.

Next, in step S712, the processor 110 performs the SSO on the normalized B-spline basis functions $N_{t,n,k}(t)$ to obtain basis functions $B_{t,n,k}^{sso}(t;\theta,a)$.

Next, in step S713, the processor 110 computes one or more first SSBEs $C_{n,j}(t;\theta,a)$ according to corresponding predetermined coefficients $b_{k,j}$ and the basis functions $B_{t,n,k}^{sso}(t;\theta,a)$ by a linear combination. For each integer j, the $j^{th}$ SSBE is denoted by $C_{n,j}(t;\theta,a)$. The summation of the linear combination is over k.

Next, in step S714, the processor 110 performs a first analog to digital (A/D) conversion on the first SSBEs to obtain one or more second SSBEs $C_{n,j}(k\alpha;m\beta,n\gamma)$. Next, in step S715, the processor 110 generates the lookup table by the second SSBEs $C_{n,j}(k\alpha;m\beta,n\gamma)$. Where, k, m, n denotes integers (just numbers for matching the sampling rate; $\alpha$, $\beta$, $\gamma$ denote the sampling rates.

Referring again to FIG. 7A in the following description. In step S720, when receiving raw data of a composite signal from a blind source, the processor 110 performs a real-time process to recover one or more active sub-signals of the composite signal according to the lookup table of SSBEs by formulating the composite signal by a Realistic Adaptive Harmonic Model (RAHM).

Referring to FIG. 7B in the following description. Specifically, in step S721, the processor 110 receives the raw data of the composite signal of the blind source. Next, in step S722, the processor 110 formulates the composite signal by the RAHM to obtain a composite signal function $f(t)$. Next, in step S723, the processor 110 performs a second A/D conversion on the composite signal function to obtain one or more discrete data samples.

Given the $j^{th}$ discrete data sample $f(t_j)$ of the blind-source $f(t)$, the processor 110 formulates the finite sum by the equation (11) below.

$$P_{f,n}^{sso}(t;\theta,a) := \Sigma_j f_{t_j} C_{n,j}(t;\theta,a) \quad (11)$$

For each time instant t, thresholding a summation $|P_{f,n}^{sso}(t;\theta,a)|$, by adjusting the scale parameter a to some desired $a^*$ and tuning the thresholding parameter gradually to extract (the largest number) $L_t$ data clusters in the time-frequency domain, where $L_t \le L$ is the number of active sub-signals of the composite signal at the time instant t (Step S724).

Next, in step S725, the processor 110 computes one or more optimal frequency parameters $(\theta_l = \theta_l^*(t))$ by determining the maximum of each of the data clusters.

Next, in step S726, the processor 110 computes the active sub-signals $(f_l(t))$ and one or more amplitudes $(|A_l(t)|)$ of the active sub-signals according to optimal frequency parameters $(\theta_l^*(t))$, an adjusted scale parameter $a^*$ and the constructed Lookup table of the second SSBEs. For each time instant t, the optimal frequency parameter $\theta_l^*(t)$ is used as input to the threshold-ed summation $|P_{f,n}^{sso}(t;\theta_l^*(t),a^*)|$ to yield the active sub-signals $f_l(t)$ and its amplitude $(|A_l(t)|)$ by computing real part and absolute value of $2 \times P_{f,n}^{sso}(t;\theta_l^*(t),a^*)$, respectively, for each l=1, ..., L.

Next, in step S727, the processor 110 computes one or more instantaneous frequencies (IF) $\varphi'_l(t)$ and one or more trends of the active sub-signals $f_l(t)$. The trends are computed by using $\theta=0$ as an input to $P_{f,n}^{sso}(t;\theta,a^*)$, where $a^*$ is the adjusted desired scale parameter.

Referring again to FIG. 7A in the following description. In step S730, the processor 110 generates analysis result comprising one or more attributes of the recovered active sub-signals.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium. The communication networks established in the various embodiments support various communication protocols such as, without limitation, Wi-Fi, the Global System for Mobile Communication (GSM) system, the Personal Handy-phone System (PHS), Code Division Multiple Access (CDMA) system, Worldwide Interoperability for Microwave Access (WiMAX) system, third-generation wireless communication technology (3G), fourth-generation wireless communication technology (4G), fifth-generation wireless communication technology (5G), Long-term Evolution technology (LTE), Bluetooth, and Ultra-Wideband (UWB).

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for recovering one or more active sub-signals from a composite signal of a blind source, comprising:

performing an offline preparing process to generate a lookup table of Continuous Wavelet Transform (CWT)-basic elements (WBEs);

when receiving raw data of the composite signal of the blind source, performing a real-time process to recover the one or more active sub-signals of the composite signal according to the lookup table of WBEs by formulating the composite signal by a Realistic Adaptive Harmonic Model (RAHM); and generating analysis data comprising one or more attributes of the active sub-signals.

2. The method of claim 1, wherein the offline preparing process comprises:

normalizing one or more B-spline basis functions ($N_{t,n,k}(t)$);

performing the CWT on the normalized B-spline basis functions ($N_{t,n,k}(t)$) to obtain basis functions ($B_{t,n,k}^w(t;a)$);

computing one or more first WBEs ($E_{n,j}(t;a)$) according to corresponding predetermined coefficients ($b_{k,j}$) and the basis functions ($B_{t,n,k}^w(t;a)$) by a linear combination;

performing a first analog to digital (A/D) conversion on the first WBEs to obtain one or more second WBEs ($E_{n,j}(k\alpha;k\beta)$); and generating the lookup table of the second WBEs ($E_{n,j}(k\alpha;k\beta)$).

3. The method of claim 2, wherein the real-time process comprises:

receiving the raw data of the composite signal of the blind source;

formulating the composite signal by the RAHM to obtain a composite signal function;

performing a second A/D conversion on the composite signal function to obtain one or more discrete data samples;

determining one or more data clusters ($L_t$) according to the discrete data samples by thresholding a summation ($|P_{f,n}^w(t,a)|$) for each time instant (t);

computing one or more optimal scales ($a_t = a_t^*(t)$) by determining the maximum of each of the data clusters;

computing the active sub-signals ($f_t(t)$) and one or more amplitudes ($|A_t(t)|$) of the active sub-signals according to the optimal scales ($a_t^*(t)$) and the constructed Lookup table of the second WBEs; and computing one or more instantaneous frequencies (IF) (($\varphi'_t(t)$)) of the active sub-signals ($f_t(t)$).

4. The method of claim 3, wherein the formulated composite signal is represented by the equation below:

$$f(t) = \sum_{l=1}^{L} (A_l(t) \cos \varphi_l(t)) X_{I_l(t)}$$

where $I_l$ denotes the disjoint union of open intervals $I_{i,j} = (U_{i,j}, V_{i,j})$, with signal on-set at $t=u_{t,j}$ and signal off-set at $t=v_{t,j}$ for $j=1, \ldots n_l$, where $n_l$ denotes the number of times when the sub-signal $f(t) = A_l(t) \cos \varnothing_l(t)$ is active; $X_{I_l}(t)$ is the characteristic function of the open set $I_l$, wherein $X_{I_l}(t)$) is equal to 1 for t belongs to $I_l$, and $XX_{I_l}(t)(t)$ is equal to 0 for t does not belons to $I_l$.

5. A computer-implemented method for recovering one or more active sub-signals from a composite signal of a blind source, comprising:

receiving the raw data of the composite signal of the blind source;

formulating the composite signal by a Realistic Adaptive Harmonic Model (RAHM) to obtain a composite signal function;

performing an analog to digital (AID) conversion on the composite signal function to obtain one or more discrete data samples, computing a Continuous Wavelet Transform (CWT) (($W_\psi f)(t,a)$) of the composite signal function ($f(t)$) by a selected wavelet function ($\psi(t)$);

determining one or more data clusters ($L_t$) according to the discrete data samples by thresholding a summation ($|(W_\psi f)(t,a)|$) by tuning a threshold parameter for each time instant (t)

determining one or more optimal scales ($a_t = a_t^*(t)$) by computing the maximum of each of the data clusters;

computing the active sub-signals ($f_t(t)$) and one or more amplitudes ($|A_t(t)|$) of the active sub-signals according to the optimal scales ($a_t^*(t)$), the CWT (($W_\psi f)(t,a)$) of the composite signal function and the selected wavelet function ($\psi(t)$);

computing one or more instantaneous frequencies (IF) ($\varphi'_t(t)$) of the active sub-signals; and generating analysis data comprising one or more attributes of the active sub-signals.

6. A computer-implemented method for recovering one or more active sub-signals from a composite signal of a blind source, comprising:

performing an offline preparing process to generate a lookup table of Short-Time Fourier Transform (STFT)-basic elements (SFBEs);

when receiving raw data of a composite signal from a blind source, performing a real-time process to recover one or more active sub-signals of the composite signal according to the lookup table of SFBEs by formulating the composite signal by a Realistic Adaptive Harmonic Model (RAHM); and generating analysis data comprising one or more attributes of the active sub-signals.

7. The method of claim 6, wherein the offline preparing process comprises:

normalizing one or more B-spline basis functions ($N_{t,n,k}(t)$);

performing the STFT on the normalized B-spline basis functions ($N_{t,n,k}(t)$) with a frequency parameter ($\theta$) to obtain basis functions ($B_{t,n,k}^{sf}(t,\theta,a)$), computing one or more first SFBEs ($D_{n,j}(t,\theta,a)$) according to corresponding predetermined coefficients ($b_{k,j}$) and the basis functions ($B_{t,n,k}^{sf}(t;\theta,a)$) by a linear combination;

performing a first analog to digital (A D) conversion on the first SFBEs to obtain one or more second SFBEs ($D_{n,j}(k\alpha;m\beta,nY)$); and generating the lookup table of the second SFBEs ($D_{n,j}(k\alpha;m\beta,nY)$).

8. The method of claim 7, wherein the real-time process comprises:

receiving the raw data of the composite signal of the blind source;

formulating the composite signal by the RAHM to obtain a composite signal function;

performing a second A/D conversion on the composite signal function to obtain one or more discrete data samples;

determining one or more data clusters ($L_t$) according to the discrete data samples by thresholding a summation ($|P_{f,n}^{sf}(t,\theta,a)|$) by tuning a threshold parameter and adjusting a scale parameter a for each time instant (t);

computing one or more optimal frequency parameters ($\theta_l = \theta_l^*(t)$) by determining the maximum of each of the data clusters;

computing the active sub-signals ($f_l(t)$) and one or more amplitudes ($|A_l(t)|$) of the active sub-signals according to optimal frequency parameters ($\theta_l^*(t)$), an adjusted scale parameter $a^*$ and the constructed Lookup table of the second SFBEs (by Computing real part and absolute value of $2 \times P_{f,n}^{sf}(t; \theta_l^*(t), a^*)$); and computing one or more instantaneous frequencies (IF) (($\phi'_l(t)$)) and one or more trends of the active sub-signals ($f_l(t)$).

9. The method of claim 8, wherein the formulated composite signal function is represented by the equation below:

$$f(t) = \sum_{l=1}^{L} (A_l(t) \cos \phi_l(t)) X_{I_l(t)}$$

where $I_l$ denotes the disjoint union of open intervals $I_{l,j} = (u_{i,j}, v_{i,j})$, with signal on-set at $t = u_{i,j}$ and signal off-set at $t = v_{i,j}$ for $j = 1, \ldots, n_l$, where $n_l$ denotes the number of times when the sub-signal $f(t) = A_l(t) \cos \phi_l(t)$ is active; $X_{I_l}(t)$ is the characteristic function of the open set $I_l$, wherein $X_{I_l}(t)$ is equal to 1 for t belongs to $I_l$, and $X_{I_l}(t)$ is equal to 0 for t does not belons to $I_l$.

10. A computer-implemented method for recovering one or more active sub-signals from a composite signal of a blind source, comprising:

receiving the raw data of the composite signal of the blind source;

formulating the composite signal by a Realistic Adaptive Harmonic Model (RAHM) to obtain a composite signal function;

performing an analog to digital (A/D) conversion on the composite signal function to obtain one or more discrete data samples;

computing a Short-Time Fourier Transform (STFT)((Tf) (t;θ,a)) of the composite signal function (f(t)) with a frequency parameter (θ);

determining one or more data clusters ($L_t$) according to the discrete data samples by thresholding a summation (|(Tf)(t;θ;a|) by tuning a threshold parameter and adjusting a scale parameter a for each time instant (t);

determining one or more optimal frequency parameters ($\theta_l = \theta_l^*(t)$) by computing the maximum of each of the data clusters;

computing the active sub-signals ($f_l(t)$) and one or more amplitudes ($|A_l(t)|$) of the active sub—signals according to the more optimal frequency parameters ($\theta_l^*(t)$); an adjusted scale parameter $a^*$ and the SIFT ((Tf)(t;θ, a)) of the composite signal function f(t) ((by Computing real part and absolute value of $2 \times P_{f,n}^{sf}(t; \theta_l^*(t), a^*)$));

computing one or more instantaneous frequencies (IF) (($\phi'_l(t)$)) and one or more trends of the active sub-signals ($f_l(t)$); and generating analysis data comprising one or more attributes of the active sub-signals.

11. A computer-implemented method for recovering one or more active sub-signals from a composite signal of a blind source, comprising:

performing an offline preparing process to generate a lookup table of Signal Separation Operation (SSO)-basic elements (SSBEs);

when receiving raw data of a composite signal from a blind source, performing a real-time process to recover one or more active sub-signals of the composite signal according to the lookup table of SSBEs by formulating the composite signal by a Realistic Adaptive Harmonic Model (RAHM); and generating analysis data comprising one or more attributes of the active sub-signals.

12. The method of claim 11, wherein the offline preparing process comprises:

normalizing one or more B-spline basis functions ($N_{t,n,k}(t)$);

performing the SSO on the normalized B-spline basis functions ($N_{t,n,k}(t)$) to obtain basis functions ($B_{t,n,k}^{SSO}(t; \theta, a)$);

computing one or more first SSBEs ($C_{n,j}(t, \theta, a)$) according to corresponding predetermined coefficients ($b_{k,j}$) and the basis functions ($B_{t,n,k}^{SSO}(t; \theta, a)$) by a linear combination;

performing a first analog to digital (A/D) conversion on the first SSBEs to obtain one or more second SSBEs ($C_{n,j}(k\alpha; m\beta, nY)$); and generating the lookup table by the second SSBEs ($C_{n,j}(k\alpha; m\beta, nY)$).

13. The method of claim 12, wherein the real-time process comprises:

receiving the raw data of the composite signal of the blind source;

formulating the composite signal with a Realistic Adaptive Harmonic Model (RAHM) to obtain a composite signal function;

performing a second AD conversion on composite signal function to obtain one or more discrete data samples;

determining one or more data clusters ($L_t$) according to the discrete data samples by thresholding a summation (|f,n SSO(t;θ, a|) by tuning a threshold parameter and adjusting a scale parameter α for each time instant (t);

computing one or more optimal frequency parameters ($\theta_l = \theta_l^*$, (t)) by determining the maximum of each of the data clusters;

computing the active sub-signals ($f_l(t)$) and one or more amplitudes ($|A_l(t)|$) of the active sub-signals according to optimal frequency parameters ($\theta_l^*(t)$), an adjusted scale parameter $a^*$ and the constructed Lookup table of the second SSBEs (by Computing real part and absolute value of $2 \times P_{f,n}^{SSO}(t; \theta_l^*(t), a^*)$); and computing one or more instantaneous frequencies (IF) (($\phi'_l(t)$)) and one or more trends of the active sub-signals ($f_l(t)$).

14. The method of claim 13, wherein the formulated composite signal function is represented by the equation below:

$$f(t) = \sum_{l=1}^{L} (A_l(t) \cos \phi_l(t)) X_{I_l(t)}$$

where $I_l$ denotes the disjoint union of open intervals $I_{l,j} = (u_{i,j}, v_{i,j})$, with signal on-set at $t = u_{i,j}$ and signal off-set at $t = v_{i,j}$ for $j = 1, \ldots, n_l$, where $n_l$ denotes the number of times when the sub-signal f (t)=Al(t) cos $\phi_l(t)$ is active; $X_{I_l}(t)$ is the characteristic function of the open set $I_l$, wherein $X_{I_l}(t)$ is equal to 1 for t belongs to $I_l$, and $X_{I_l}(t)$ is equal to 0 for t does not belons to $I_l$.

15. An analysis device for recovering one or more active sub-signals from a composite signal of a blind source, comprising:

a data communication circuit unit, configured to receive raw data of the composite signal of the blind source;

a non-transient memory circuit, configured to store machine instructions; and a processor, wherein the processor is configured to execute the machine instructions to implement a sub-signal recovering method, the sub-signals recovering method comprises:

performing, by the processor, an offline preparing process to generate a lookup table of Continuous Wavelet Transform (CWT)-basic elements (WBEs);

when receiving raw data of the composite signal of the blind source, performing, by the processor, a real-time process to recover the one or more active sub-signals of the composite signal according to the lookup table of WBEs by formulating the composite signal by a Realistic Adaptive Harmonic Model (RAHM); and generating, by the processor, analysis data comprising one or more attributes of the active sub-signals.

* * * * *